April 5, 1938.                A. J. WILLIAMS, JR                 2,113,436
                                MEASURING SYSTEM
                     Filed July 25, 1934              5 Sheets-Sheet 1

INVENTOR

April 5, 1938.  A. J. WILLIAMS, JR  2,113,436
MEASURING SYSTEM
Filed July 25, 1934    5 Sheets—Sheet 3

INVENTOR

Albert J Williams Jr
INVENTOR

Patented Apr. 5, 1938

2,113,436

UNITED STATES PATENT OFFICE 2,113,436

MEASURING SYSTEM

Albert J. Williams, Jr., Philadelphia, Pa., assignor to Leeds & Northrup Company, Philadelphia, Pa., a corporation of Pennsylvania Application July 25, 1934, Serial No. 736,853

32 Claims. (Cl. 172—239)

My invention relates to methods of and apparatus for determining the magnitude or changes in magnitude of a measured condition, such as thermal, mechanical, physical, electrical, etc., and more particularly to balanced networks or circuits including a galvanometer, or other detector responsive to unbalance.

In accordance with my invention, upon change in magnitude of the measured condition, the movement of the galvanometer coil, or equivalent, from a neutral control position initiates operation of a driving system for rebalancing adjustment of the network, and during the rebalancing operation, there is produced an effect, whose magnitude is a function of the speed of the driving system, which limits displacement of the coil from neutral control position to small magnitudes and which jointly with the unbalance due to the change of the measured condition produces deflections of the coil for regulating the speed of the driving system to obtain rebalance in a minimum of time without overshooting.

More particularly, in some forms of my invention, the elements cooperating with the coil for control of the motor speed are shifted by the rebalancing motor so that the neutral control position is changed at substantially the same speed as the coil position in responding to unbalance of the network; in those modifications of this type in which the field magnet for the coil is also shifted, as well as in other forms of my invention in which the neutral position and field magnet is not moved, a small generator driven by the rebalancing motor introduces into the galvanometer circuit a voltage which is proportional to its speed; more specifically, in the last mentioned forms, the introduced voltage also preferably has a component whose magnitude is a direct function of the acceleration of the rebalancing operation.

In other forms of my invention, during the rebalancing operation, there is introduced into the measuring or detector circuit a voltage whose magnitude varies as a power of the speed of rebalancing higher than the first power.

My invention further resides in the methods and systems hereinafter described and claimed.

For an understanding of my invention and for an illustration of various forms thereof, reference is to be had to the accompanying drawings, in which.

Figure 1:
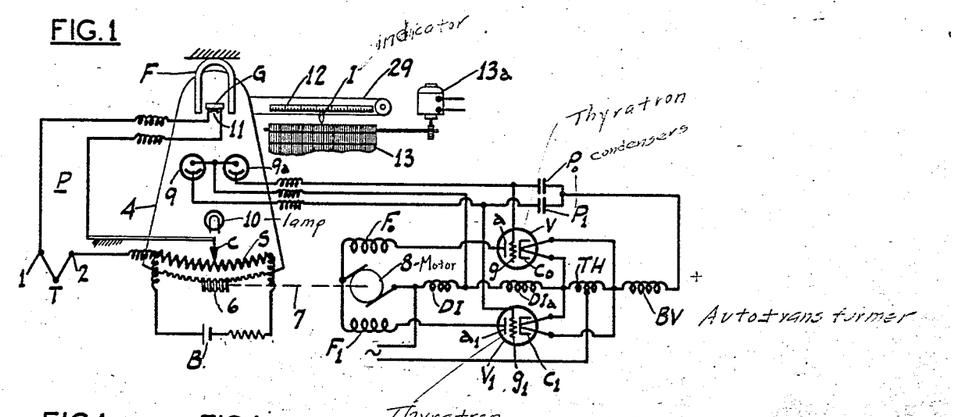
Fig. 1 schematically illustrates a potentiometer system utilizing the invention.

Referring to Fig. 1, there is produced across the terminals 1 and 2 of the measuring network P, a voltage whose magnitude is determined by, or varies with, the magnitude of the particular condition under measurement; specifically, the thermocouple T is a device responsive to the variations in temperature, or radiant energy impressed upon it, to produce between the terminals 1 and 2 a correspondingly varying voltage which is balanced by adjustment of the contact C along the potentiometer slide wire S across whose terminals is connected a suitable source of current B. So long as the system is in balance, there is no current flowing through the coil G, and consequently there is no torque exerted tending to deflect the coil. Upon change in the voltage across the points 1 and 2, due to increase or decrease of the condition under measurement, current flows through the coil G, and the resulting reaction with the magnetic field, produced by the field producing device F, which may be a permanent magnet or a suitable electro-magnet, produces a torque tending to rotate the coil in one direction or the other depending upon the sense of the unbalance.

Figures 1A, 1B, 2, 3:
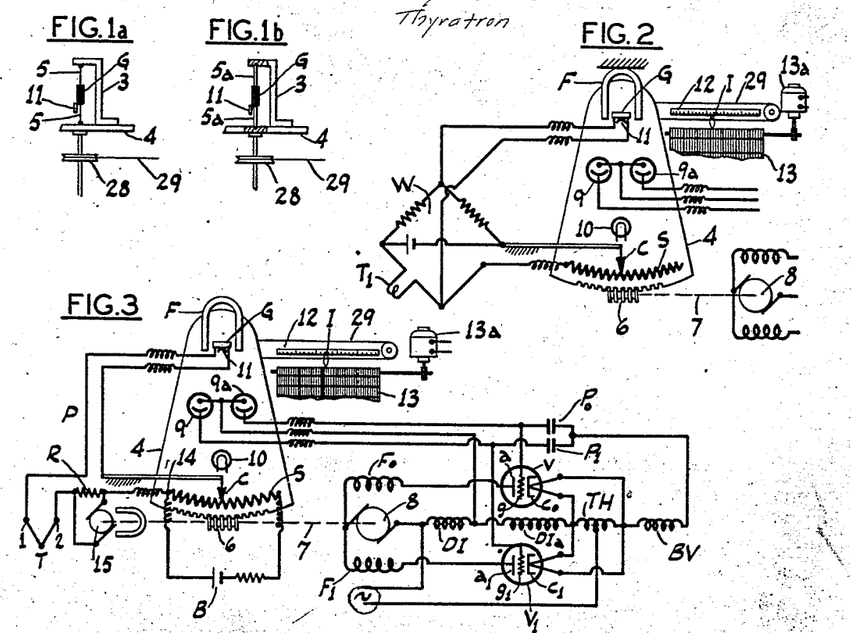
Figs. 1a and 1b are detail views, in side elevation, of coil suspension systems.
Fig. 2 illustrates a system using apparatus shown in Fig. 1 in a network of the Wheatstone bridge type.
Fig. 3 schematically illustrates a system in which the galvanometer field system is movable.

As more clearly appears in Fig. 1a, the coil suspension system comprises the bracket 3, carried by the supporting member 4, and the suspension strips or springs 5, 5, which may be, as usual in galvanometer construction, thin flat strips of gold, silver, or other metal; or as shown in Fig. 1b, the coil may be supported by the pivoted shaft 5a. Either type of suspension may be used for the galvanometer coil of any of the systems herein described. The strip suspension is preferred as it avoids pivot friction.

The support 4, Fig. 1a, as schematically illustrated by gear 6 and dotted line 7, is adapted to be swung in either direction by the motor 8 in accordance with the sense of deflection of the coil G. This may be effected by attaching a switch arm to the galvanometer coil G which will engage one contact or the other of a reversing switch when the needle deflects from a position between the contacts which are mounted on the support. However, I prefer to use the arrangement shown which comprises the photo-cells 9, 9a carried by the support 4, a source of light or lamp 10, also carried by the support, and a small mirror or reflector 11 carried by the movable coil.

When the potentiometer circuit is balanced, the beam of light reflected by the mirror 11 does not impinge upon either photo-cell or equivalent device, e. g. the coil is in a neutral control position; when the galvanometer deflects in one direction, the beam is received by one cell 9 or 9a, and upon deflection of the coil in opposite direction, the beam is received by the other cell. By a relay arrangement which is more specifically hereinafter described, when one of the photo-cells receives the reflected beam, one of the field windings Fo of motor 8 is energized to drive the support 4 in one direction, and when the other photo-cell receives the beam, the other field winding F1 is energized to effect movement of the support 4 in a reverse direction.

The motor and its connections are such that the slide-wire support can be accelerated at a rate preferably at least as great as the maximum acceleration of the coil G.

The direction in which the support 4 is moved by the motor 8 is always such that the torque due to change in voltage of the responsive device T is reduced; that is, the support is moved in the same direction as the deflection of the coil.

Concurrently with this torque-reducing movement of the support 4, the circuit is being rebalanced by adjustment of the contact C by operation of the motor 8. As appears in Fig. 1, the slide wire S is adjusted concurrently with the movement of the support 4, the relative movement between the contact C and slide wire S being in the proper sense to restore balance of the network. Accordingly, in the arrangement described, after the coil G deflects in response to unbalance of the network it does not return to its previous position when the network is rebalanced but remains in its new position.

The pointer or marker I, which may be generically termed "controlled structure" of the measuring system, is coupled to the movable support, or to the slide wire, for movement in unison therewith so that its position with respect to the scale 12, or to the recorder sheet 13 driven by the constant speed motor 13a, is uniquely determined by the magnitude of the voltage produced by the responsive device T. Specifically the cord 29 for moving the element I passes over the driving pulley 28 which rotates with support 4, as shown in Fig. 1a.

The motor 8 is preferably one capable of producing a high torque so that the support 4 will very closely follow the pointer in its deflecting movement. When the support overtakes the galvanometer coil moving toward its final position, the motor is deenergized, and when the support 4 passes the neutral position, the other photo-cell receives the beam of light to effect energization of the other winding of the motor to provide a braking impulse. The beam rapidly shifts from one cell to the other, remaining for longer periods on the cell giving braking impulses as balance is approached. The entire action, the response to unbalance and rebalancing, is completed in a very short interval of time, as one second, even for maximum change of the measured condition within the range of the instrument.

The system shown in Fig. 2 is generally the same as that of Fig. 1, except that the measuring network is of the Wheatstone bridge type instead of the potentiometer type. Briefly, when the bridge W is unbalanced because of change in the condition, as temperature, measured by the responsive device T1, which in this case is specifically illustrated as a coil of material having a substantial temperature coefficient of resistance, the galvanometer G deflects in one position or the other from neutral control position, depending upon the sense of unbalance of the bridge, whereupon the motor 8 effects actuation of the support 4 in such direction that the actuating force, or torque, on the coil system produced by the change of the measured condition is reduced, and concurrently there is effected relative adjustment of the contact C and slide wire S in proper direction to rebalance the bridge. The system comes to balance with the coil displaced in space from its original position but in the same neutral control position with respect to the photo-cells, or alternative motor circuit-control elements.

In the arrangements described, because the field magnet of the galvanometer is fixed in space, for every different magnitude of the condition the coil G occupies a different position in the magnetic field. For highly precise measurements this is not desirable since it is practically impossible to produce a field which is absolutely symmetrical; even minute particles of magnetic dust are sufficient to introduce error.

Therefore, I prefer, as shown in Fig. 3, to mount the field magnet F, or equivalent, upon the support 4, so that for all positions of balance of the network, whatever may be the position of the coil G in space, it will have the same position relative to the field magnet. With this arrangement as thus far described, since the field magnet tends to follow the coil, there is a substantial reduction or elimination of the generator action which in the system of Fig. 1 tends to oppose the deflection of the galvanometer coil G in response to the unbalance of the network, and which therefore gives desirable damping to the coil movement.

In the system of Fig. 3, the point 2 may be directly connected to the terminal 14 of the slide wire by a conductor of low or negligible resistance, but with such connection, due to the small or negligible counter E. M. F. induced in the coil G, there will be a tendency for the system to hunt or overshoot the position of balance. To overcome this, there is produced a torque acting on the coil system counter to the torque resulting from the change of the measured condition, which counter-torque is a function of the speed of rebalancing; more specifically, there is introduced into the network P, during rebalance, a voltage which is in opposition to the unbalanced voltage, and whose magnitude is a direct function of the speed of rebalancing. As shown, this can be conveniently effected by mechanically connecting a small generator 15 to the motor 8 to produce at the generator terminals a voltage which is proportional to the speed of the motor 8. The current through the resistance R, and therefore the voltage drop produced thereby across the terminals of the resistance, is proportional to the speed of support 4. The introduction of this voltage into the network produces a damping torque substantially eliminating the tendency for the system to overshoot the point of balance while permitting rapid rebalancing, e. g. by design or adjustment, the system may be given a critically damped characteristic affording a minimum time for rebalancing for any extent of unbalance without overshooting.

It is characteristic of the operation of the system that no matter how great the torque due to change of the measured condition, the angle of deflection of coil G with respect to the median line between the photo-cells is always small or zero.

Figure 4:
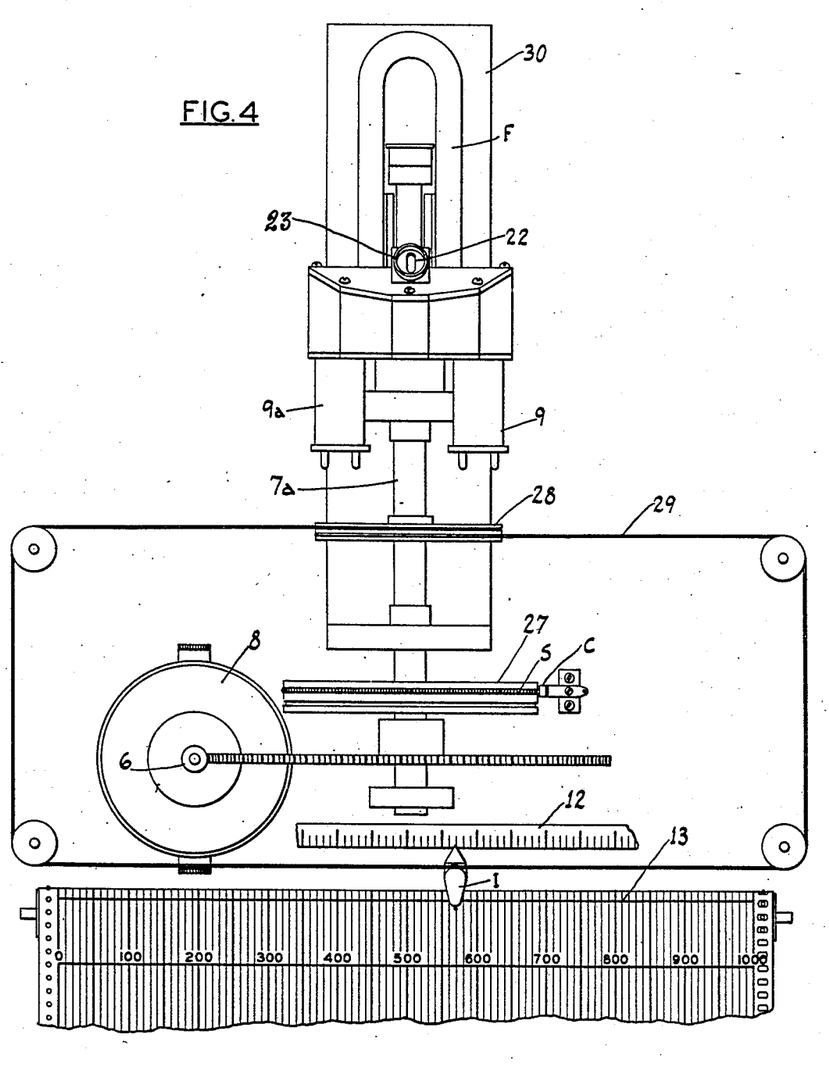
Figs. 4, 5 and 6 are front elevation, side elevation, and plan views, respectively, of apparatus shown in Figs. 1 to 3 with parts omitted and parts in section, for clarity.
Figure 5:
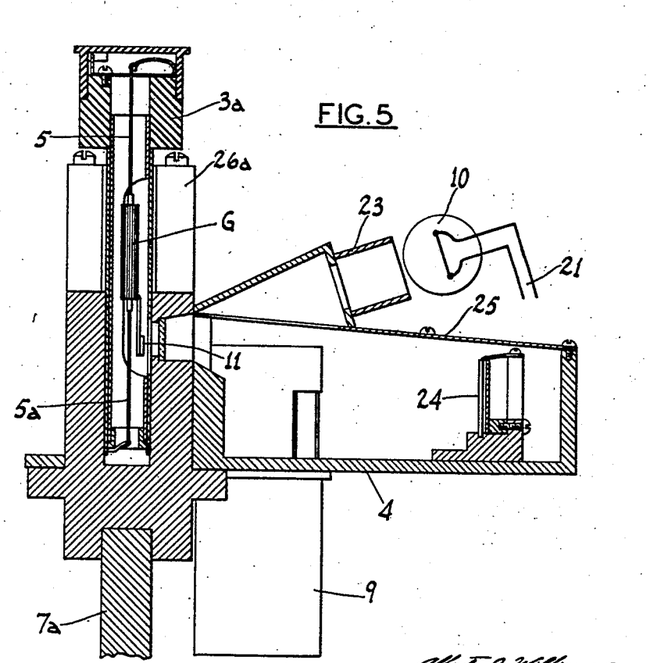
Figure 6:
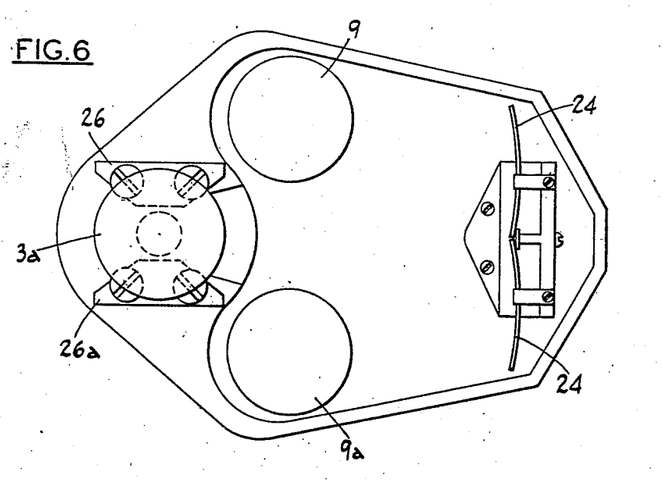

Figs. 4, 5 and 6 illustrate details of construction of a high speed recording and indicating mechanism suitable for use in the systems thus far described. Upon the support 4 is mounted a bracket for the lamp 10 from which light passes through the slot 22 in the member 23 to the mirror 11 which reflects the beam, when the coil G is in deflected position, on to one or the other of the mirrors 24 within the photo-cell housing 25 depending upon the sense of the deflection. The photo-cells 9, 9a, respectively, are preferably at the focal points of the mirrors.

The galvanometer coil G is held by its suspensions 5, 5a between the pole pieces 26, 26a. When the practice of the modification shown in Fig. 3 is to be followed, the field magnet F, Fig. 1, is attached to and moves with these pole pieces, for movement with the support 4. As more clearly shown in Fig. 4, the support 4 is rotatable with the shaft 7a which is driven from gear 6 of motor 8. Upon the same shaft is mounted the disk 27 which carries the slide wire S for movement with respect to a fixed contact C. Upon the shaft 7a is also mounted the pulley 28 which through the cord 29, or equivalent, effects movement of the indicator of pointer I.

When the practice of the modification of Fig. 1 is to be followed the construction may be the same, except that the magnet F is secured to a back board 30 which is held stationary.

As clearly shown in Fig. 5, it is desirable that the axis of rotation of the support 4 be concentric with the axis of deflection of the galvanometer coil G.

A preferred control system for the motor 8 is shown in Figs. 1, 3 and subsequent figures. One terminal of a source of alternating current, as a commercial power or light line, is connected to the tapped winding TH which supplies current for heating the cathodes Co, C1 of the two tubes V, V1, preferably grid controlled rectifying tubes, such as "thyratrons." The other terminal of the source is connected to one armature terminal of the motor 8. The field windings Fo, F1 are connected between the other armature terminal of motor 8 and the anodes $a$, $a1$, of the two thyratrons whose grids $g$, $g1$, are connected respectively to the cathodes of the photo-cells 9, 9a. The anodes of the photo-cells are connected to a suitable point afforded, for example, by the voltage dividing impedances DI, DIa. The winding BV, which may be a coil of an autotransformer including coils DI, DIa and TH, through the condensers Po, P1, applies to the grids $g$, $g1$ an alternating voltage of such magnitude and phase that no anode current flows in either of tubes V, V1, when neither of the photo-cells receives light from source 10. There is no flow of anode current because the grid and anode voltages are out of phase with the result that when each anode is in turn positive, the voltage of the associated grid is below the critical voltage and the anode-cathode path within the tube is of extremely high resistance. When, however, either of the photo-cells receives light, the grid of the corresponding tube becomes positive while its plate is positive, allowing full plate current to flow through the corresponding motor winding Fo or F1 for each positive half wave to apply either driving impulses or braking impulses depending upon immediately prior conditions of operation.

This control system has the advantage that full torque is applied to the motor for the slightest deflection of the coil G; coil G is not required to perform any work in actuating switch contacts; the use of contacts involving inertia, sparking, variable contact resistance, is avoided, etc. However, my invention is not limited to use of this type of control system.

In the several modifications already described, the galvanometer coil has no fixed neutral position in space, but has a different neutral position for every different position of balance of the slide-wire.

Figure 7:
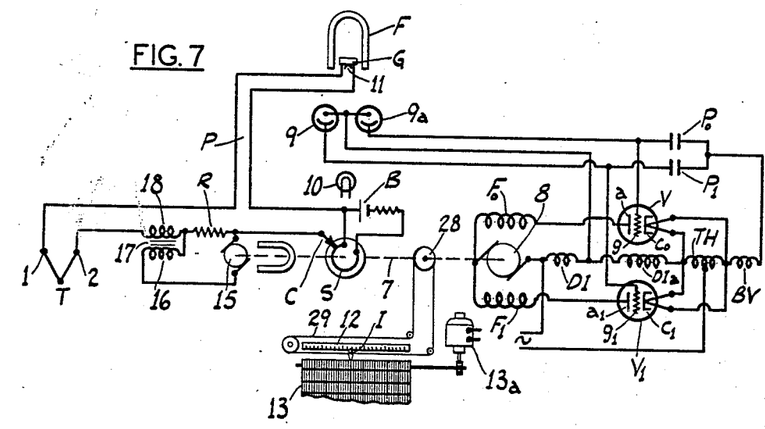
Fig. 7 is a modification in which the field system and coil-suspension system are stationary.

In the system shown in Fig. 7, the galvanometer field magnet, the galvanometer support, and the photo-cells, or equivalent control means, remain stationary and the neutral position of the galvanometer coil is fixed in space. As in the other modifications, deflection of coil G in response to change of the measured condition effects rotation of motor 8 in one direction or the other to adjust slide-wire S or equivalent to rebalance the measuring network. To effect rebalancing in a minimum of time without overshoot, there is utilized an arrangement including the direct-current generator 15 driven by motor 8. The transformer 17 having its primary 16 in the generator circuit and its secondary in the measuring circuit introduces into the galvanometer circuit a voltage proportional to the acceleration of the motor; otherwise expressed, the voltage introduced into the primary network by transformer 17 is an infinitesimal calculus function of the rate of rebalancing of the measuring network. Ignoring for the moment other torques on the coil system, the acceleration of the galvanometer is therefore, at all times proportional to the acceleration of the motor 15, and in starting from rest, both the coil and motor 15 move as if geared together. With no other torque on the galvanometer, this control keeps the average acceleration of the motor zero. For any other torque applied to the galvanometer, the control system above described applies a proportional acceleration to the motor; therefore, the greater the applied torque, the greater the counter-torque due to the generator 15 and transformer 17. Of these other torques, the one due to the unbalance in voltage between the thermocouple T and the slide-wire S is the one of most importance.

As thus far described, the slide-wire would tend to oscillate about the position of rebalance like an undamped galvanometer about its zero; the inertia involved is that of the motor armature and moving parts driven thereby, and the stiffness factor is the relation between accelera. or. (net torque) applied to the motor and unbalance of the slide-wire expressed as the angular relation of the motor shaft, e. g. the angle through which the shaft should rotate to effect balance.

To prevent this oscillation, damping is effected by applying a counter-torque to the galvanometer which is proportional to the speed of motor 8. Specifically, the resistance R in the circuit of generator 15 is included in the galvanometer circuit to introduce a voltage proportional to the speed of motor 8. The net effect is a modification of the control of motor 8 so that it has an added acceleration (component) proportional to its own speed, which is the desired damping effect.

Assuming that the system is balanced, e. g. that the thermocouple voltage equals the effective slide-wire voltage, and the motor 8 is at rest, and that the thermocouple voltage abruptly changes to a new value, the slide-wire will rapidly move to its new position of balance in accordance with the same law as the needle of a critically damped galvanometer if connected across the thermocouple, would follow in moving to a new deflection; e. g. this system, as well as others disclosed, involving a null method of measurement with all its advantages, procures a measurement as rapidly as a deflection instrument.

Contrasted with other high speed recorders using balanced networks, my systems have a small dead range or great per cent sensitivity; with my arrangements can be used a galvanometer of such high sensitivity that a very minute unbalance will cause sufficient deflection to start rebalance, whereas of other recorders it is generally true that the sensitivity cannot be increased beyond a certain point for then the galvanometer, for large unbalances, goes off scale, its coil and suspension system being subjected to the shock of engagement with stops, etc. In my arrangements, no matter how large the unbalance, the angle of deflection of the galvanometer coil is always small since the counter-torques, immediately applied and effective during rebalancing, keep the galvanometer coil at or near zero at all times, e. g. the net torque acting on the galvanometer coil is always small. The ratio of the length of the recorder chart, or length of the slide-wire, to the smallest distance through which the coil must deflect to initiate rebalance (the per cent sensitivity) can be made practically as high as desired; for example, the chart may be ten inches long and yet the system will respond to a change in magnitude corresponding to as little as .025 inch on the chart. In my systems, the extent of movement of the slide-wire is not proportional to the deflection of the galvanometer coil occurring upon change of the measured condition, but is proportional to the torque which the unbalance produces on the galvanometer coil.

Figure 7A:
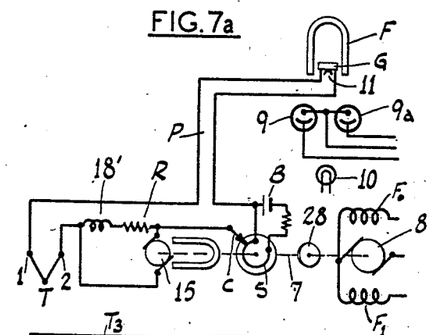
Figs. 7a and 7b illustrate alternatives of the system of Fig. 7.
Figure 7B:
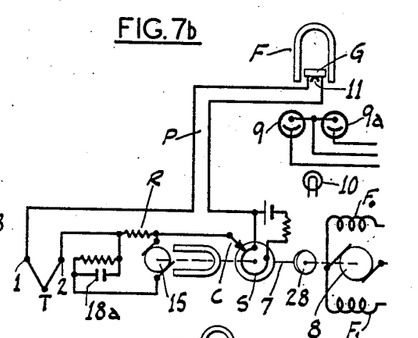

Figs. 7a and 7b show alternative methods of introducing into the galvanometer network a counter voltage having components proportional to speed and acceleration or whose magnitude is dependent upon different functions of the rate of rebalancing of the primary or measuring network. Referring to Fig. 7a, the voltage drop across the inductance 18', due to the current from the generator, will have as one component a voltage due to the direct current resistance of the winding, which is proportional to the speed of the generator, and another component which is dependent upon the rate of change of speed of the generator. Upon rapid increase, for example, of the generator current, the coil will offer an impedance which is the greater the greater the rate of increase of the current; consequently, the voltage drop due to this second component will be enhanced. So long as the speed of the generator remains constant the only voltage across the terminals of the coil due to the generator current is that determined by the direct current resistance in the coil, and is therefore constant. Practically, however, this condition does not exist during condition of operation as ordinarily the motor speed is always increasing or decreasing. The voltage across R due to the flow of the generator current is continuously proportional to the speed of the generator and therefore the speed of rebalancing.

The system shown in Fig. 7b is also suitable for introducing into the network a voltage proportional to speed and acceleration of the coil suspension support during the rebalancing operation. The more rapid the change of current, the less the reactance offered by the condenser 18a; consequently, more current from the generator 15 passes through the resistance R to increase the voltage drop across the terminals of this resistance.

Figure 8:
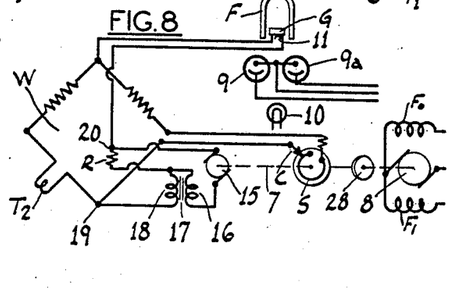
Fig. 8 shows use of the basic elements of Fig. 7 in a Wheatstone bridge network.

When a Wheatstone bridge or like network is used with this modification or that of Fig. 3 in which the field magnet follows the deflection of the coil, the voltage produced by the generator 15 or equivalent is introduced into the arm of the bridge which includes the galvanometer coil, as shown in Fig. 8. Though I have illustrated the particular arrangement shown in Fig. 7, which utilizes a series arrangement of resistance and mutual inductance, either of the other arrangements of Figs. 7a or 7b may be used.

Figure 9:
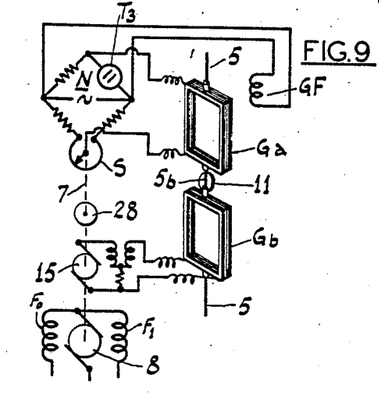
Fig. 9 illustrates use of a multi-coil galvanometer.

It is not essential that the counter-torques result from introduction of an electromotive force into the galvanometer circuit. As shown in Fig. 9, the coil system of the galvanometer may comprise two coils movable as a unit but electrically separate. One of them, Ga, is traversed by the unbalance current of the measuring network N, and the other Gb receives current from the generator 15. As in the other modifications motor 8, or other driving system, is responsive to deflection of the coil system to actuate the slide-wire and generator 15 for rebalancing in a minimum time without overshooting. The measuring network specifically shown in Fig. 9 is a Wheatstone bridge circuit for making conductivity measurements. The conductivity cell T3 is in one arm of the bridge which, as shown, is preferably supplied from an alternating current source which also supplies the field coil GF of coil Ga. Coil Gb has its own field, for example, a permanent magnet, or a field coil energized by direct current.

Figure 9A:
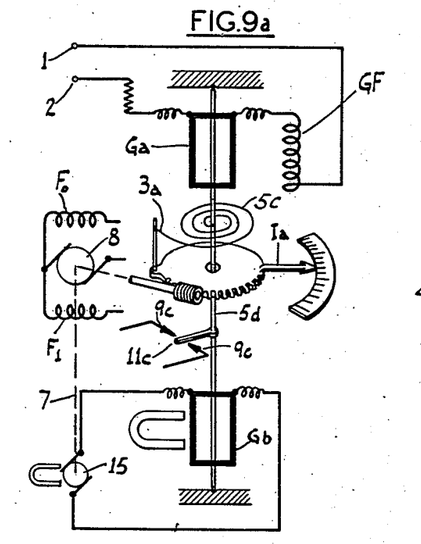
Fig. 9a illustrates use of another multi-coil device.

Referring to Fig. 9a, the coil Ga is of a deflection instrument. One end of the spring 5c which opposes the torque effecting deflection of coil Ga is fast to the coil shaft 5d and the other end of the spring is secured to an abutment 3a, adjustable by the motor 8, or other driving system, controlled by the contacts 11c, 9c, or other circuit controlling arrangement. Upon change in the current through Ga, the coil deflects in one direction or the other depending upon the sense of the current change whereupon the driving system changes the position of abutment 3a until the torque of spring 5c again balances the electrical torque, concurrently changing the position of controlled structure, as indicator Ia, and/or a recorder pen, etc. The magneto 15 driven during the rebalancing adjustment by the driving system produces in the coil Gb, movable with coil Ga, a torque of magnitude determined by the speed of rebalancing and in opposition to the electrical torque of coil Ga, to effect rebalancing in minimum of time without overshoot. In addition, a torque proportional to acceleration may be produced in Gb by any one of the various expedients shown in Figs. 7, 7a or 7b.

Figure 10:
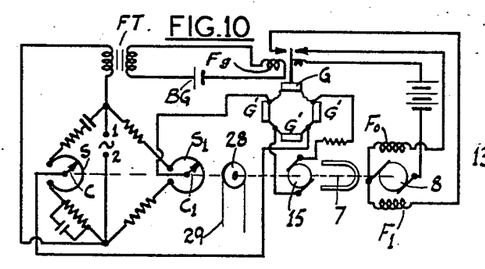
Figs. 10 to 14 show further modifications of the invention.

It is not necessary, however, to provide separate coils when the measuring circuit uses alternating current for as shown in Fig. 10, both direct current from generator 15 and alternating current from the unbalanced network may traverse one and the same coil G. The particular network shown is a frequency-responsive bridge such as more specifically described and claimed in Wunsch Patent 1,751,538. A change in frequency of the current supplied by the source connected to terminals 1, 2 of the network produces a difference in voltage between the contacts C, C1 of the slide-wires S, S1 which is impressed through balanced bridge G, G', G', G' upon the galvanometer coil G which is in one arm of the bridge. Alternating current is supplied to the field coil Fg of the galvanometer through the transformer FT.

Deflection of the coil effects energization of motor 8 in proper direction to adjust the slide-wires S, S1 for rebalance of the network. Direct current from the generator 15 which is driven by motor 8 is also impressed upon coil G, through the network G, G', G', G', which introduces a voltage component which is a direct function of the slide-wire speed. The battery BG supplies the direct current component of the galvanometer field for reaction with the direct current component of the coil current to produce a countertorque having the same purpose and following the same law of variation as in the prior modifications.

Figure 11:
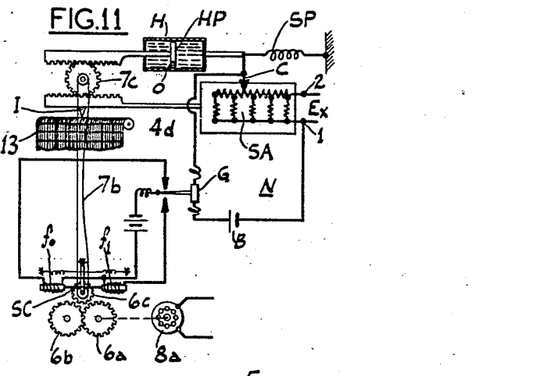

In the system shown in Fig. 11, the slide-wire device SA may be, for example, an attenuator network giving logarithmic variation of output voltage. The voltage Ex to be measured is applied to the terminals 1, 2, the resistance between which is constant, and contact C is adjusted until the constant voltage of B is balanced. The detector system responsive to unbalance may include a contact-controlling galvanometer, as indicated; or it may include an optical system as in prior modifications; or it may be of the chopper-amplifier type disclosed and claimed in my copending application Serial No. 634,425 filed September 22, 1932, which can also be used with the systems of Figs. 12 to 14.

The driving system for effecting the rebalance may be a reversible motor, as in the prior modifications, or it may, as shown, comprise a selective clutch device SC. When the network N is unbalanced in one direction, coil f1 effects driving engagement between driven gear 6c and driving gear 6a, and for opposite sense of unbalance of the network gear 6c is moved by coil fo into engagement with the other driving gear 6b for movement in opposite direction. The driving motor 8a is constantly rotating in one direction. This type of driving system may be substituted for the reversible motor of other modifications.

The motion of gear 6c is transmitted to gear 7c by a belt 7b, or equivalent friction device, permitting slip. Other limited torque transmission arrangements may alternatively be used between motor 8a and gear 7c.

Assuming that the impressed voltage Ex decreases the driving system responding to the detector G rotates gear 7c in such direction that the support for the attenuator SA moves to the left toward the new position of balance. Concurrently, the piston HP having a small aperture O, or other leak, is moved to the right, the difference in pressure on opposite sides of the piston being proportional to the square of the speed of the movement of the piston relative to the housing or cylinder H, which is connected to the slide-wire contact C. The pressure differential effecting movement of the housing is opposed by the spring SP. As a result, the displacement of contact C in space from its neutral position during rebalancing is a function of the square of the speed of rebalancing. The control system does not come to rest at the new magnitude of the condition until the network is balanced and contact C has returned to its neutral position.

As noted above, the control for the driving system uses contacts actuated mechanically by the galvanometer instead of an optical system. The use of butt contacts is not always possible due to the limited torque available; when they are used in this or any of the other modifications, they prevent the coil, or equivalent, from moving far from its neutral position and so afford rapid response of the driving system, under which circumstance the introduction of a torque which is a function of acceleration may be omitted. In general, in cases where the detector has a slow speed of response, it is more desirable that a torque proportional to acceleration be introduced into the rebalancing than in systems using a detector with a high speed of response.

Figure 12:
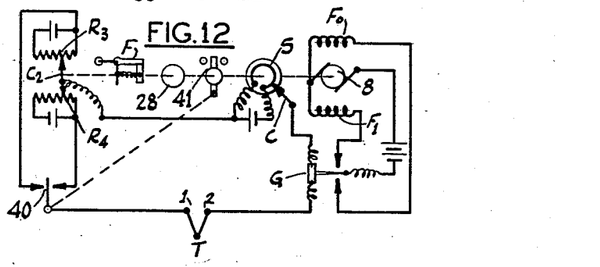

The modification shown in Fig. 12 is similar to that of Fig. 11 in that during the rebalancing there is introduced into the galvanometer circuit a voltage proportional to the square of the speed of rebalancing in opposition to the unbalanced voltage due to change of the measured condition. The flyball F, or equivalent centrifugal device driven by motor 8, is mechanically connected to the contact C2, whose position, therefore, is proportional to the square of the speed of rebalancing. The reversely poled voltage-dividing or potentiometer resistances R3, R4 are selectively connected through switch 40 in circuit with the galvanometer. The switch 40 is operated as by slip clutch 41 so that when motor 8 is energized in one direction, resistance R3 is connected in circuit, and when energized in reverse direction resistance R4 is connected in circuit. The centrifugal device by adjustment of contact C2 therefore provides for voltages proportional to the square of the speed of rebalancing and switch 40 selects the one of proper polarity. During rebalancing, the galvanometer coil system is, therefore, subject to a torque varying as the square of the speed of rebalancing and the control of motor 8 is accordingly modified.

Figure 13:
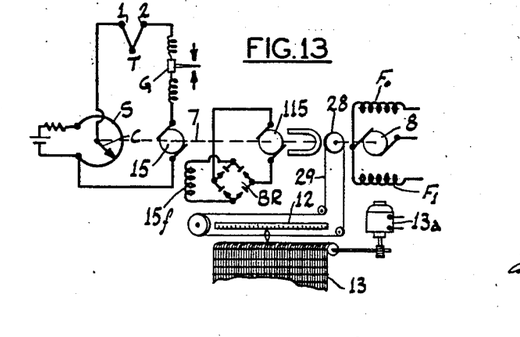

A somewhat simpler arrangement for obtaining the same result and using the same method is shown in Fig. 13. In this modification, the excitation for the field 15f of generator 15 is supplied by a second generator 115 also driven by motor 8 so that the output voltage of generator 15 varies as the square of the speed of rebalancing. To obtain proper polarity of the voltage of generator 15 for both directions of rotation, the current in its field is caused to flow always in the same direction. This is conveniently effected by connecting a bridge rectifier BR between the field 15f and the output terminals of generator 115. The rectifier elements are preferably of the solid type, using copper copper-oxide plates.

Figure 14:
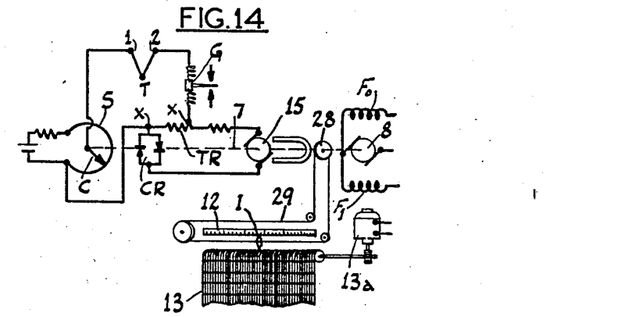

The system of Fig. 14 also provides for introduction, into the measuring network during the rebalancing, of a voltage whose magnitude varies as a power higher than the first power of the speed of rebalancing. The output circuit of the magneto or generator 15 driven during the rebalancing operation includes a resistance TR and a resistance CR having the characteristic of exhibiting lesser resistance at higher current densities; for example, as shown CR may comprise oppositely poled solid rectifiers, of the copper copper-oxide type for example, whose forward resistance decreases the higher the forward current, the variation following a law higher than the first power; or it may comprise an untreated carbon filament lamp which has a generally similar current-resistance characteristic. In both cases, the higher the speed of rebalancing, the greater the proportion of the voltage generated by magneto 15 is developed between the points $x, x$ for introduction into the measuring circuit.

A like result may be obtained by using an ordinary resistance at CR, and a metallic filament lamp, as a tungsten lamp, at TR, since the resistance of such a lamp increases with increase of current. Again, the higher the speed of rebalance the higher the voltage generated by the magneto, and the greater the proportion of total generated voltage developed across the points $x, x$, thereby to obtain rapid unbalancing without overshooting.

The law of variation of the generated voltage between points $x, x$ may be made to follow a still higher power law by utilizing a carbon lamp resistance or copper oxide rectifiers at CR and a tungsten or other metallic filament lamp resistance at TR.

While I have described and explained various systems, it is to be understood that my invention is not limited thereto but is co-extensive in scope with the appended claims.

What I claim is:

1. In a system unbalanced by change in magnitude of a condition under measurement, including a member deflecting in response to the unbalance, and a driving system responsive to deflection of said member from neutral position to effect rebalancing adjustment of an element of said system, the method which comprises during the rebalancing adjustment producing an effect whose magnitude is a direct function of the speed of said element, and controlling the position of said member from neutral position by the unbalance and said effect jointly for regulating the speed of said driving system.

2. In a system unbalanced by change in magnitude of a condition under measurement, including a member deflecting in response to the unbalance, and a driving system responsive to deflection of said member from neutral position to effect rebalancing adjustment of an element of said system, the method which comprises during the rebalancing adjustment producing an effect substantially proportional to the rate of change of the speed of said element, and controlling the position of said member by the unbalance and said effect jointly for regulating the speed of the driving system.

3. In a system unbalanced by change in magnitude of a condition under measurement, including a member deflecting in response to the unbalance, and a driving system responsive to deflection of said member from neutral position to effect rebalancing adjustment of an element of said system, the method which comprises during the rebalancing adjustment producing an effect substantially proportional to the speed of said driving system, producing an effect substantially proportional to the acceleration of said driving system, and controlling the position of said member by said effects and the unbalance jointly for regulating the speed of the driving system.

4. In a system unbalanced by change in magnitude of a condition under measurement, including a member deflecting in response to the unbalance, and a motor responsive to deflection of said member from neutral position to effect rebalancing adjustment of an element of said system, the method which comprises during the rebalancing adjustment producing an effect substantially proportional to the speed of said element, and controlling the position of said member by the unbalance and said effect jointly for regulating the speed of the motor.

5. In an electrical network unbalanced by change in magnitude of a condition under measurement including a member, deflecting in response to the unbalance, for controlling a driving system which effects rebalancing adjustment of the network, the method which comprises producing a voltage whose magnitude is substantially proportional to the speed of said driving system, and introducing said voltage into the network to control the deflection of said member jointly in accordance with the extent of unbalance and the speed of rebalancing for regulation of the speed of said driving system.

6. In an electrical network unbalanced by change in magnitude of a condition under measurement including a member, deflecting in response to the unbalance, for controlling a driving system which effects rebalancing adjustment of the network, the method which comprises producing a voltage whose magnitude is substantially proportional to the rate of change of the speed of said driving system, and introducing said voltage into the network to control the deflection of said member jointly in accordance with the extent of unbalance and the rate of change of the speed of rebalancing for regulation of the speed of said driving system.

7. In an electrical network unbalanced by change in magnitude of a condition under measurement including a member, deflecting in response to the unbalance, for controlling a driving system which effects rebalancing adjustment of the network, the method which comprises producing a voltage whose magnitude is substantially proportional to the speed of said driving system, producing a voltage whose magnitude is substantially proportional to the acceleration of said driving system, and introducing said voltages into the network to control the deflection of said member jointly in accordance with the extent of unbalance and the speed and the rate of change of speed of rebalancing for regulation of the speed of said driving system.

8. In a system including a member deflecting in response to a torque resulting from a change in magnitude of a measured condition, and a driving system responsive to deflection of said member from neutral position to effect an adjustment of an element of said system for causing said member to move toward neutral control position, the method which comprises, during said adjustment, producing an effect whose magnitude is a direct function of the speed of said driving system, and controlling the position of said member from neutral position by said torque and said effect jointly to vary the speed of adjustment of said element as a function of said torque and said effect.

9. In a system including a member deflecting in response to a torque resulting from a change in magnitude of a measured condition, and a driving system responsive to deflection of said member from neutral position to effect an adjustment of an element of said system for causing said member to move toward neutral control position, the method which comprises, during said adjustment, producing an effect of magnitude substantially proportional to the speed of said motor, utilizing said effect to produce a counter-torque of proportional magnitude upon said member, said torque and counter-torque jointly determining the position of said member, and varying the speed of adjustment of said element in accordance with the position of said member.

10. In a system including a member deflecting in response to a torque resulting from a change in magnitude of a measured condition, and a driving system responsive to deflection of said member from neutral position to effect an adjustment of an element of said system for causing said member to move toward neutral control position, the method which comprises, during said adjustment, producing an effect of magnitude substantially proportional to the acceleration of said driving system, and utilizing said effect to produce a counter-torque of proportional magnitude upon said member, said torque and counter-torque jointly determining the position of said member for regulation of the speed of adjustment of said element.

11. In a system including a member deflecting in response to a torque resulting from a change in magnitude of a measured condition, and a driving system responsive to deflection of said member from neutral position to effect an adjustment of an element of said system for causing said member to move toward neutral control position, the method which comprises, during said adjustment, producing an effect of magnitude substantially proportional to the second power of the speed of said driving system, and utilizing said effect to produce a counter-torque of proportional magnitude upon said member, said torque and counter-torque jointly determining the position of said member for regulation of the speed of adjustment of said element.

12. In a system including a member deflecting in response to a torque resulting from a change in magnitude of a measured condition, and a driving system responsive to deflection of said member from neutral position to effect an adjustment of an element of said system for causing said member to move toward neutral control position, the method which comprises, during said adjustment, producing an effect of magnitude substantially proportional to the speed of said driving system, producing an effect of magnitude substantially proportional to the acceleration of said driving system, and utilizing said effects to produce counter-torques upon said member, said torque and said counter-torques jointly determining the position of said member for regulation of the speed of adjustment of said element.

13. A system comprising a member deflecting from neutral position in response to application of a torque resulting from change in magnitude of a measured condition, means adjustable to effect movement of said member to neutral position, a driving system responsive to deflection of said member from neutral position for adjusting said means, and means for producing on said member a torque of magnitude which is a direct function of the speed of said driving system and which jointly with said first torque controls the position of said member for regulation of the speed of said driving system.

14. An electrical network unbalanced upon change in magnitude of a measured condition, a member deflecting from neutral position in response to application of a torque produced by unbalance of the network, an impedance adjustable to rebalance said network, a driving system responsive to deflection of said member from neutral position, and means for producing on said member a torque which is a direct function of the speed of said driving system and which jointly with said unbalance torque controls the position of said member for regulating the rate of adjustment of said impedance by said driving system.

15. An electrical network unbalanced upon change in magnitude of a measured condition, a member deflecting from neutral position in response to application of a torque produced by unbalance of the network, an impedance adjustable to rebalance said network, a driving system responsive to deflection of said member from neutral position, and means including means operated by said driving system for introducing into said network a voltage of magnitude varying as direct function of the speed of said driving system.

16. A system comprising a member deflecting from neutral position in response to application of a torque resulting from change in magnitude of a measured condition, means adjustable to effect movement of said member to neutral position, a driving system responsive to deflection of said member from neutral position for adjusting said means, means including means operated by said driving system to produce a current of magnitude substantially proportional to the speed of said driving system, and means for applying to said member a torque of magnitude substantially proportional to the rate of change of said current.

17. An electrical network unbalanced upon change in magnitude of a measured condition, a member deflecting from neutral position in response to application of a torque produced by unbalance of the network, an impedance adjustable to rebalance said network, a driving system responsive to deflection of said member from neutral position, means including means operated by said driving system to produce a current of magnitude substantially proportional to the speed of said driving system, and means for deriving from said current and introducing into said network a voltage having a component proportional to the speed of said driving system and a component proportional to the acceleration of said driving system.

18. An electrical network unbalanced upon change in magnitude of a measured condition, a member deflecting from neutral position in response to application of a torque produced by unbalance of the network, an impedance adjustable to rebalance said network, a driving system responsive to deflection of said member from neutral position, and means including means operated by said driving system for introducing into said network a voltage substantially proportional to the second power of the speed of said driving system.

19. A system comprising a member deflecting from neutral position in response to changes in magnitude of a measured condition, photo-electric cells selectively energized for opposite deflections of said member from neutral position, a pair of grid-controlled rectifiers having said photo-electric cells in their respective grid circuits, a reversible motor having windings connected respectively in the anode circuits of said rectifiers, a source of alternating current for supplying said rectifiers and photo-electric cells, a direct-current generator driven by said motor for producing a current of magnitude which is a direct function of the speed of said motor, and means for applying to said member a torque proportional to said current to control the actuation of said photo-electric cells.

20. In a system including means for producing a standard electrical effect, means for producing an opposing electrical effect of magnitude determined by the magnitude of a condition under measurement, a detector energized in accordance with the resultant of said effects, and a driving means controlled by the detector to effect balance of said effects by adjustment of an element of said system, the method which comprises producing, during the balancing adjustment, an effect varying as a power higher than the first power of the speed of said driving means, and controlling the energization of the detector by said last effect and said resultant effect jointly for regulation of the speed of said driving means.

21. In a system including means for producing a standard electrical effect, means for producing an opposing electrical effect of magnitude determined by the magnitude of a condition under measurement, a detector energized in accordance with the resultant of said effects, and a driving means controlled by the detector to effect balance of said effects by adjustment of an element of said system, the method which comprises producing, during the balancing adjustment, an effect substantially proportional to the square of the speed of said driving means, and controlling the energization of the detector by said last effect and said resultant effect jointly for regulation of the speed of said driving means.

22. A system comprising means for producing a standard electrical effect, means for producing an electrical effect of magnitude determined by the magnitude of a condition under measurement, a network in which said effects are brought into opposition, a detector energized by unbalance of said network, an impedance in said network adjustable to rebalance it, a driving system controlled by said detector for effecting adjustment of said impedance, and means for introducing into said network an electrical effect substantially proportional to a power higher than the first power of the speed of said driving system.

23. A system comprising means for producing a standard electrical effect, means for producing an electrical effect of magnitude determined by the magnitude of a condition under measurement, a network in which said effects are brought into opposition, a detector energized by unbalance of said network, an impedance in said network adjustable to rebalance it, a driving system controlled by said detector for effecting adjustment of said impedance, and means for introducing into said network an electrical effect substantially proportional to the square of the speed of said driving system.

24. In a device of the class described, a detector comprising an electrical network having a condition-responsive element and a galvanometer connected therein, an amplifier including two low inertia relays respectively controlled by said galvanometer, a movable member, a motor for moving said member to a predetermined point under the control of said amplifier, and means including a magneto generator driven by said motor and serving to reduce the current through said galvanometer to zero as said member approaches said predetermined point whereby the deceleration of said motor is completed when said predetermined point is reached.

25. In a device of the class described, a detector comprising an electrical network having a condition-responsive element and a galvanometer connected therein, an amplifier including two low inertia relays controlled by said galvanometer, a movable member, a motor for moving said member to a predetermined point under the control of said amplifier, and means cooperating with said motor to reduce the current through said element to zero as said member approaches said predetermined point whereby the deceleration of said motor is completed when said predetermined point is reached.

26. In a device of the class described, a detector comprising an electrical network having a thermo-responsive element and a galvanometer connected therein, said network being normally electrically balanced, said element being responsive to a changing condition for disturbing the electrical balance of said network, an amplifier including two low inertia relays controlled by said galvanometer, a movable member, a motor for progressively moving said member under the control of said amplifier to a predetermined point as indicated by the lack of balance of said network, and anticipating means responsive to the action and direction of action of said movable member for decelerating said motor.

27. In a device of the class described, a normally balanced primary network including an element responsive to changing conditions to unbalance said network and deflectable means having an active and an inactive condition, said means being responsive to the lack of balance of said primary network to establish its active condition, a member movable to restore the balance of said network and thereby cause said means to return to its inactive condition, a motor controlled by said means in its active condition for operating said member, and means cooperating with said motor to reduce the current through said element to zero as said member approaches said predetermined point whereby the deceleration of said motor is completed when said predetermined point is reached.

28. The method of restoring the balance of an electrical system which comprises effecting an adjustment for rebalance of the system in response to an unbalanced electrical effect, and in such manner as to decrease the unbalance until balance is reestablished, and during the rebalancing adjustment opposing said unbalanced electrical effect by an electrical effect whose magnitude is a function of the rate of balancing and an infinitesimal calculus function of that rate.

29. A system comprising a balanceable network, means in said network for producing an unbalanced electrical effect, means adjustable to effect rebalance of said network, means responsive to said unbalanced electrical effect, driving means controlled by said responsive means to effect adjustment of said adjustable means, and means operative during said adjustment to oppose said unbalanced electrical effect by an electrical effect whose magnitude is a function of the rate of adjustment and an infinitesimal calculus function of that rate.

30. A system comprising a balanceable network, means for producing an unbalanced electromotive force in said network, an impedance adjustable to effect rebalance of said network, means responsive to unbalance of said network, driving means controlled by said responsive means to effect adjustment of said impedance, and a secondary network comprising a source of electromotive force, resistance and reactance for producing an electromotive force, in opposition to said unbalanced electromotive force, whose magnitude is a function of the rate of adjustment of said impedance and an infinitesimal calculus function of that rate.

31. A system comprising a balanceable network, means for producing an unbalanced electromotive force in said network, an impedance adjustable to effect rebalance of said network, means responsive to unbalance of said network, driving means controlled by said responsive means to effect adjustment of said impedance, and a secondary network comprising a generator, operative during adjustment of said impedance, resistance and reactance for producing an electromotive force, in opposition to said unbalanced electromotive force, whose magnitude is a function of the rate of adjustment of said impedance and an infinitesimal calculus function of that rate.

32. A system comprising a balanceable network, means for producing an unbalanced electromotive force in said network, an impedance adjustable to effect rebalance of said network, means responsive to unbalance of said network, driving means controlled by said responsive means to effect adjustment of said impedance, and a secondary network comprising a generator, operative during adjustment of said impedance, resistance and inductance for producing an electromotive force, in opposition to said unbalanced electromotive force, whose magnitude is dependent upon different functions of the rate of said adjustment.

ALBERT J. WILLIAMS, Jr.